(12) United States Patent
Mieyan et al.

(10) Patent No.: US 10,940,723 B2
(45) Date of Patent: Mar. 9, 2021

(54) ELECTRONIC UNIT FOR MEASURING OPERATING PARAMETERS OF A VEHICLE WHEEL, COMPRISING AN ELECTRONIC CASING AND AN INFLATION VALVE OF ELASTICALLY DEFORMABLE TYPE

(71) Applicants: Continental Automotive France, Toulouse (FR); Continental Automotive GmbH, Hannover (DE)

(72) Inventors: Jérémy Mieyan, Toulouse (FR); Christian Kempf, Toulouse (FR); Julien Lecaillon, Toulouse (FR)

(73) Assignees: Continental Automotive France; Continental Automotive GmbH

( * ) Notice: Subject to any disclaimer, the term of this patent is extended or adjusted under 35 U.S.C. 154(b) by 0 days.

(21) Appl. No.: 16/962,071

(22) PCT Filed: Feb. 7, 2019

(86) PCT No.: PCT/FR2019/050274
§ 371 (c)(1),
(2) Date: Jul. 14, 2020

(87) PCT Pub. No.: WO2019/155170
PCT Pub. Date: Aug. 15, 2019

(65) Prior Publication Data
US 2020/0346502 A1      Nov. 5, 2020

(30) Foreign Application Priority Data

Feb. 9, 2018   (FR) ...................................... 1851107

(51) Int. Cl.
*F16K 15/20*      (2006.01)
*B60C 23/04*      (2006.01)
(Continued)

(52) U.S. Cl.
CPC ........ *B60C 23/0494* (2013.01); *B60C 29/002* (2013.01); *B60C 29/005* (2013.01);
(Continued)

(58) Field of Classification Search
CPC ............ Y10T 137/3662; B60C 29/005; B60C 23/0494; G01L 17/00
See application file for complete search history.

(56) References Cited

U.S. PATENT DOCUMENTS 7,107,830 B1 *   9/2006   Yu ...................... B60C 23/0408
                                                    73/146
2004/0084124 A1   5/2004   Martin
(Continued)

FOREIGN PATENT DOCUMENTS

DE      102014119430 A1   6/2016
EP        1816014 A2      8/2007

OTHER PUBLICATIONS

International Search Report and Written Opinion for International Application No. PCT/FR2019/050274, dated Jun. 17, 2019, 7 pages.
(Continued)

*Primary Examiner* — Robert K Arundale
(74) *Attorney, Agent, or Firm* — RatnerPrestia

(57) ABSTRACT

An electronic unit for measuring operating parameters of a vehicle wheel, including: an inflation valve of the "snap-in" type having a valve body made of an elastically deformable material, and a rigid hollow tube, an electronics casing, and a device for attaching the electronic casing and of the inflation valve. The device for attaching the electronics casing and the inflation valve consists of a solid pin made from a material having a density lower than that of the material of which the rigid hollow tube is made and having longitudinal grooves that allow a flow of air to pass through the valve, a proximal portion of the pin being configured to
(Continued)

be attached to the electronics casing, and a distal portion of the pin being configured to be attached to the rigid hollow tube of the inflation valve.

15 Claims, 3 Drawing Sheets

(51) Int. Cl.
  *B60C 29/00* (2006.01)
  *B60C 29/02* (2006.01)
  *G01L 17/00* (2006.01)

(52) U.S. Cl.
  CPC .............. *B60C 29/02* (2013.01); *G01L 17/00* (2013.01); *Y10T 137/3662* (2015.04)

(56) References Cited

U.S. PATENT DOCUMENTS

| 2006/0288924 A1* | 12/2006 | Katou ................ B60C 23/0408 116/34 R |
| 2007/0113637 A1* | 5/2007 | Blossfeld ............ B60C 23/0494 73/146.8 |
| 2008/0276995 A1 | 11/2008 | Ray et al. |
| 2008/0302425 A1* | 12/2008 | Hettle ................ B60C 23/0491 137/227 |
| 2009/0007649 A1* | 1/2009 | Kempf ................ B60C 23/0408 73/146.8 |
| 2010/0064792 A1 | 3/2010 | Chuang et al. |
| 2015/0059948 A1* | 3/2015 | Lelievre ................ B60C 29/02 152/427 |

OTHER PUBLICATIONS

International Search Report and Written Opinion for International Application No. PCT/FR2019/050274, dated Jun. 17, 2019, 12 pages (French).

English Translation of the Written Opinion for International Application No. PCT/FR2019/050274, dated Jun. 17, 2019; 6 pages.

\* cited by examiner

ELECTRONIC UNIT FOR MEASURING OPERATING PARAMETERS OF A VEHICLE WHEEL, COMPRISING AN ELECTRONIC CASING AND AN INFLATION VALVE OF ELASTICALLY DEFORMABLE TYPE

CROSS REFERENCE TO RELATED APPLICATIONS

This application is the U.S. National Phase Application of PCT International Application No. PCT/FR2019/050274, filed Feb. 7, 2019, which claims priority to French Patent Application No. 1851107, filed Feb. 9, 2018, the contents of such applications being incorporated by reference herein.

FIELD OF THE INVENTION

The present invention relates to an electronic unit for measuring operating parameters of a vehicle wheel, comprising an inflation valve of elastically deformable type and an electronics casing.

BACKGROUND OF THE INVENTION

Motor vehicles are increasingly being fitted with systems for monitoring and/or measuring operating parameters of a vehicle wheel comprising sensors.

By way of example of such systems, mention may be made of tire pressure monitoring systems (TPMS), which comprise electronic modules mounted on each of the vehicle wheels, these being dedicated to measuring parameters, such as the pressure and/or temperature of the tires with which these wheels are equipped, and intended to inform the driver of any abnormal variation in the measured parameter.

One current solution, as depicted in FIG. 1, which is used for attaching the electronics casings to the rims of the wheels, is to produce electronic units each made up:

of an inflation valve 1 of the elastic deformation type better known by the name of a "snap-in" valve, comprising:
  a valve body 1a made of an elastomer material, provided with a longitudinal axial bore and intended to extend through an orifice made in a rim J, said valve body being made up of an elastically deformable trunk and of an abutment head for butting against the rim, which head is separated from the trunk by a neck designed to become positioned in airtight fashion in the orifice made in said rim, and
  a rigid hollow tube 1b extending in the body of the valve extended by an assembly section 1c in the extension of the abutment head of said valve body, said valve body 1a and said rigid hollow tube 1b being designed and assembled so as to allow an elastic deformation of the trunk of the valve body in order to allow installation of the inflation valve through the orifice of the rim J,
of an electronics casing 2, and
of means 3 of attachment of the electronics unit to the assembly section of the rigid hollow tube of the inflation valve, in a position of said electronics unit 2 in which the latter extends in the continuation of said inflation valve 1.

Based on this principle, a first embodiment of the means of attachment of the electronics unit to the inflation valve is to fix the electronics unit, for example by screwing (as illustrated in FIG. 1) onto the end of the assembly section 1c of the cylindrical tube of the inflation valve. This technique offers the advantage of providing an assembly that is robust, although on the other hand it entails creating an empty space between the abutment head of the valve body and said electronics casing: such an empty space is in fact essential in order, when the inflation valve equipped with an electronics casing is being fitted, to allow axial and radial deformations of the trunk of the valve body so that it can be introduced into and pass through the orifice in the rim. Now, creating such a distance leads to a significant phenomenon of out-of-balance which means that the dynamic performance of such electronic units is appreciably reduced.

In addition, it has been found that this design leads to a significant restriction of the performance, in terms of airtightness and longevity, of the inflation valves.

Specifically, such an empty space means that the center of gravity Ge of the inflation valve/electronics casing assembly is offset appreciably from the center of gravity Gv of the inflation valve alone, consequentially leading to a change to those regions of the surface of the inflation valve that provided the sealing, and to an increase in the stresses experienced at the regions of contact between the inflation valve and the rim.

A second embodiment (not depicted) involves creating electronics casings which are fitted with an assembly sleeve able to slide along the assembly section of the rigid hollow tube of the inflation valve, and equipping each electronic unit with means of attaching the electronics casing and the inflation valve which means are designed to attach the latter, once the inflation valve has been mounted on a rim, in a position of the electronics casing in which the latter extends in the direct continuation of the inflation valve.

This technique makes it possible to improve the dynamic performance of the electronic unit because of the fact that the electronics casings are positioned in the direct continuation of the inflation valves. On the other hand, at the present time, the means for securing the inflation valve and the electronics housing consist of fasteners such as clips, snap rings, spring collars of the "grip clip" type, clamping collars, "O-clamps", screw collars, locking plate, etc. type liable, with a non-insignificant probability, to become damaged or even disconnected during the fitting and removal of a tyre. In addition, the majority of these fasteners require special purpose tooling in order to fit and remove them and therefore also contribute to making the steps of fitting and removing the electronic units more complex.

SUMMARY OF THE INVENTION

An aspect of the present invention seeks to overcome these disadvantages and its main aim is to provide an electronic unit provided with means of attachment of the electronics casing and of the inflation valve which are not liable to become damaged or disconnected during the fitting and/or removal of a tire, while at the same time being suited to holding the electronics casing in a position in which it extends in the direct continuation of the inflation valve, so as to give the electronic unit as a whole good dynamic performance.

Another aspect of the invention is to provide an electronic unit of which the means of attachment of the electronics casing and of the inflation valve is readily accessible and easily maneuvered by means of a simple ordinary tool.

According to an aspect of the invention, this objective is achieved by virtue of an electronic unit for measuring operating parameters of a vehicle wheel, comprising:
  an inflation valve of the elastic deformation type better known by the name of a "snap-in" valve, comprising:

a valve body made of an elastomer material, provided with a longitudinal axial bore and intended to extend through an orifice made in a rim of the wheel, said valve body being made up of an elastically deformable trunk and of an abutment head for butting against the rim, which head is separated from the trunk by a neck designed to become positioned in airtight fashion in the orifice made in said rim, and a rigid hollow tube extending into the valve body, said valve body and said rigid hollow tube being designed and assembled so as to allow an elastic deformation of the trunk of the valve body in order to allow installation of the inflation valve through the orifice of the rim, an electronics casing, and means of attachment of the electronics casing and of the inflation valve, in a position of said electronics casing in which the latter extends in the continuation of said inflation valve.

This electronic unit is notable in that the means of attachment of the electronics casing and of the inflation valve consist of a solid pin made from a material having a density lower than that of the material of which the rigid hollow tube extending into the valve body is made and having, at least over a portion of its length, longitudinal grooves that allow a flow of air to pass through said inflation valve, a proximal portion of said pin being configured to be attached to the electronics casing, and a distal portion of said pin being configured to be attached to the rigid hollow tube of the inflation valve.

The electronic unit according to an aspect of the invention affords several beneficial advantages. In particular:

it allows an improvement in the dynamic performance of the electronic unit during running while at the same time ensuring sufficient strength notably when a tire is being mounted on the rim;

it offers a simple and robust solution to the assembling of the inflation valve with the electronics casing.

According to one preferred and advantageous embodiment, the pin is made of aluminum.

According to a first exemplary embodiment, the pin has an I-shaped cross section.

According to another exemplary embodiment, the pin has a star-shaped cross section.

According to one advantageous embodiment, the pin has, on its distal portion, an entry chamfer allowing it to be inserted into the rigid hollow tube of the inflation valve.

According to one exemplary embodiment, the pin is fixed removably to the electronics casing.

According to one exemplary embodiment, the proximal end of the pin has a blind hole with a tapped thread constituting a hole for screw-fastening the electronics casing along a longitudinal axis of said pin.

According to another exemplary embodiment, the pin is fixed permanently to the electronics casing.

According to one exemplary embodiment, the pin, on its proximal portion, has at least one orifice.

These orifices may allow the passage of an overmolding material, affording the advantageous feature of allowing the pin and the electronics casing to be produced by overmolding so that they are thus produced as a single piece.

According to another exemplary embodiment, said at least one orifice formed on the proximal portion of the pin is provided with a tapped thread and constitutes a hole for the passage of a screw for a screw-fastening to the electronics casing along an axis perpendicular to a longitudinal axis of said pin.

BRIEF DESCRIPTION OF THE DRAWINGS

Other aspects, features and advantages of the present invention will become apparent from the following description, provided by way of non-limiting example with reference to the appended drawings, in which.

DETAILED DESCRIPTION OF THE PREFERRED EMBODIMENTS

In the present description, the terms "proximal" and "distal" are used with reference to the positions of the constituent elements of the electronic unit according an aspect of to the present invention.

Figure 1:
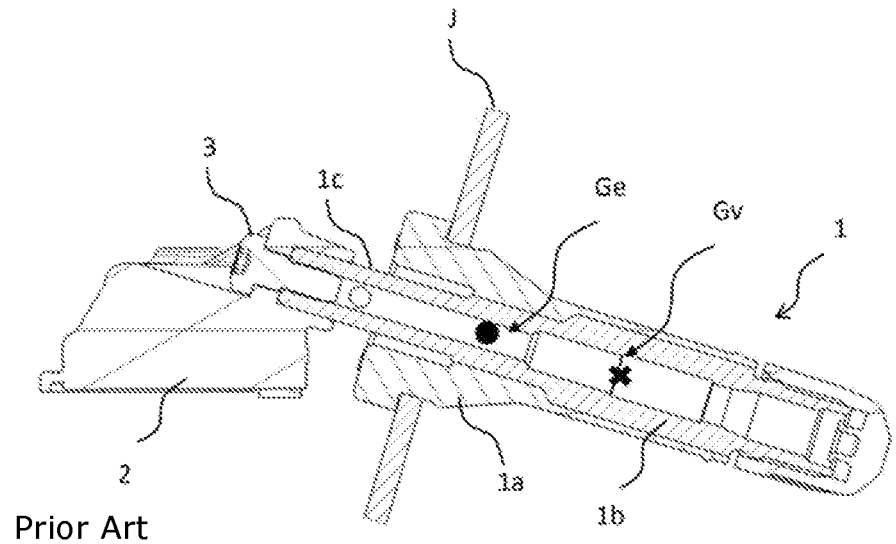
FIG. 1, already discussed, is a view in longitudinal section of an electronic unit according to the prior art.
Figure 2:
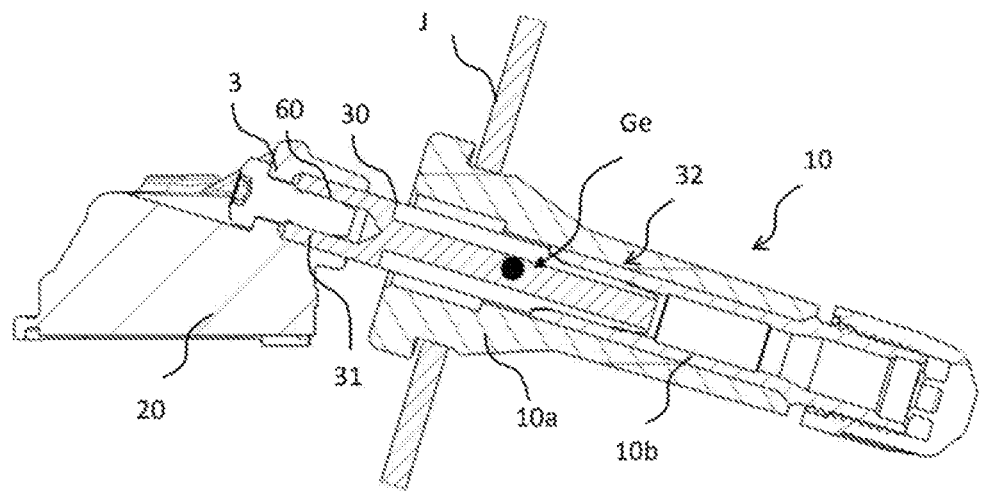
FIG. 2 is a view in longitudinal section of an electronic unit according to an aspect of the invention.

According to the exemplary embodiment illustrated in FIG. 2, the electronic unit for measuring operating parameters of a vehicle wheel, comprising:

an inflation valve 10 of the elastic deformation type better known by the name of a "snap-in" valve, comprising:

a valve body 10*a* made of an elastomer material, provided with a longitudinal axial bore and intended to extend through an orifice made in a rim J of the wheel, said valve body being made up of an elastically deformable trunk and of an abutment head for butting against the rim, which head is separated from the trunk by a neck designed to become positioned in airtight fashion in the orifice made in said rim, and a rigid hollow tube 10*b* extending into the valve body, said valve body 10*a* and said rigid hollow tube 10*b* being designed and assembled so as to allow an elastic deformation of the trunk of the valve body in order to allow installation of the inflation valve 10 through the orifice of the rim J, an electronics casing 20, and means of attachment of the electronics casing 20 and of the inflation valve 10, in a position of said electronics casing in which the latter extends in the continuation of said inflation valve.

According to an aspect of the invention, the means of attachment of the electronics casing 20 and of the inflation valve 10 of the electronic unit consist of a solid pin 30.

The pin 30 has a proximal portion 31 configured to be attached to the electronics casing 20, and a distal portion 32, opposite to the proximal portion 31, configured to be attached to the rigid hollow tube 10*b* of the inflation valve 10.

The pin 30 is made from a material having a density lower than the density of the material (generally brass) of which the rigid hollow tube 10*b* extending into the valve body 10*a* is made.

As a preference and advantageously, the pin 30 is made of aluminum. In that way, because of the lightening of the electronic unit according to an aspect of the invention as a result of this pin 30 of a density lower than the density of the material (generally brass) of which the rigid hollow tube 10*b* is made, the dynamic performance of said electronic unit during running is improved while at the same time ensuring sufficient strength, because the pin is solid, notably when a tire is being mounted on the rim, the latter having a tendency to create a bearing force on the electronics casing 20.

The pin 30 has longitudinal grooves 40 allowing a flow of air to pass through the inflation valve 10.

The longitudinal grooves 40 extend at least over a portion of the length of the pin 30, from the end of the distal portion 32 thereof. The grooves allow a flow of inflation air to pass into a chamber created by the tire mounted on the rim of a wheel.

Figure 3:
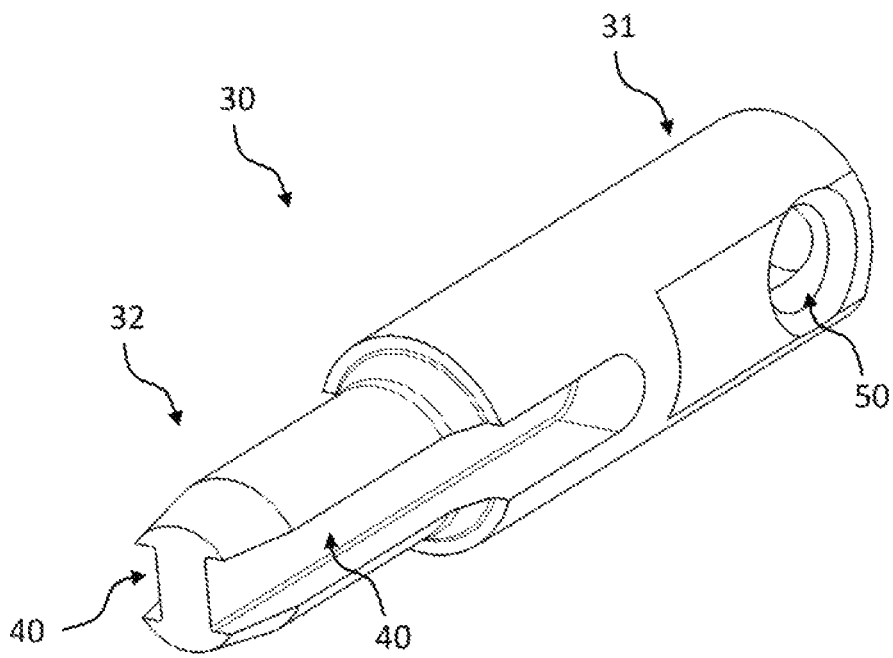
FIG. 3 is a perspective view of a first exemplary embodiment of the pin according to the invention.

According to a first exemplary embodiment illustrated in FIG. 3, the pin 30 has an I-shaped cross section so as to create two longitudinal grooves 40 for the passage of a flow of air.

Figure 4:
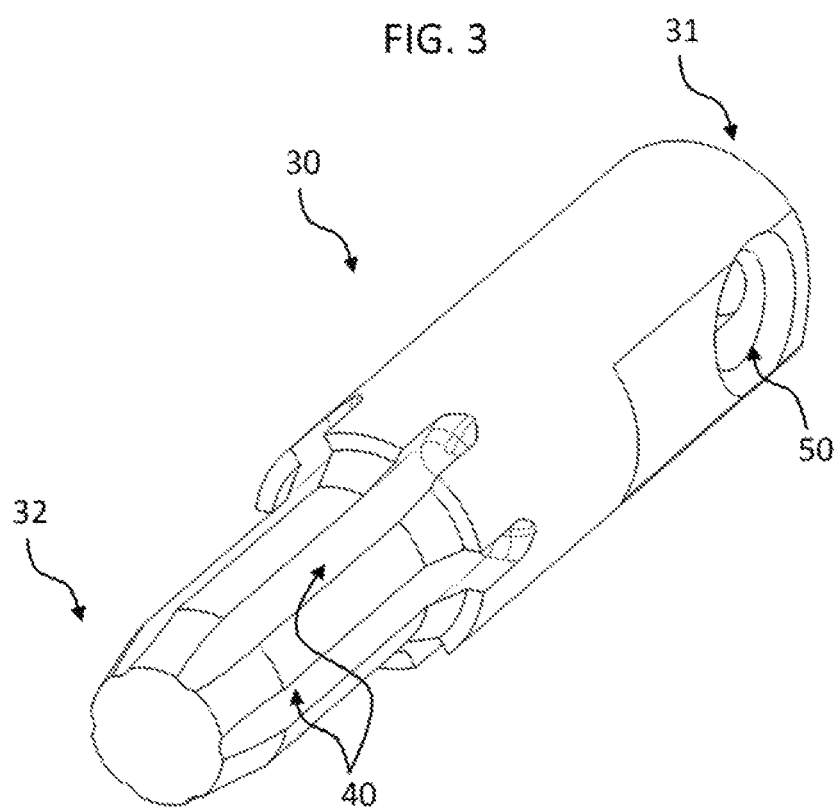
FIG. 4 is a perspective view of a second exemplary embodiment of the pin according to the invention.

According to another exemplary embodiment illustrated in FIG. 4, the pin 30 has a star-shaped cross section so as to create a plurality of longitudinal grooves 40 for the passage of a flow of air.

The pin 30 is configured to be attached to the rigid hollow tube 10b of the inflation valve 10 via the distal portion 32 thereof. The pin is attached to the rigid hollow tube 10b of the inflation valve 10 by any method known per se. For example, the pin 30 is forcibly inserted into the rigid hollow tube 10b. Advantageously, the pin 30 has, on its distal portion 32, an entry chamfer allowing it to be inserted into the rigid hollow tube 10b of the inflation valve 10.

According to another exemplary embodiment which has not been depicted, the pin is screwed into the rigid hollow tube 10b. In that case, the distal portion 32 of said pin is provided with a screw thread able to engage with a thread with which the rigid hollow tube 10b opposite would be provided.

The pin 30 is fastened to the electronics casing 20 by any method known per se. For example, the pin is push-fitted into a housing provided for that purpose in said electronics casing. The pin may alternatively be attached to the electronics casing by crimping. The pin 30 is fastened to the electronics casing 20 either removably, or permanently.

In the exemplary embodiment illustrated in FIG. 2, the proximal end 31 of the pin 30 has a blind hole 60 extending over a portion of the length of said pin, this blind hole 60 being provided with a tapped thread constituting a hole for screw-fastening to the electronics casing 20 along a longitudinal axis of the pin.

Figure 5:
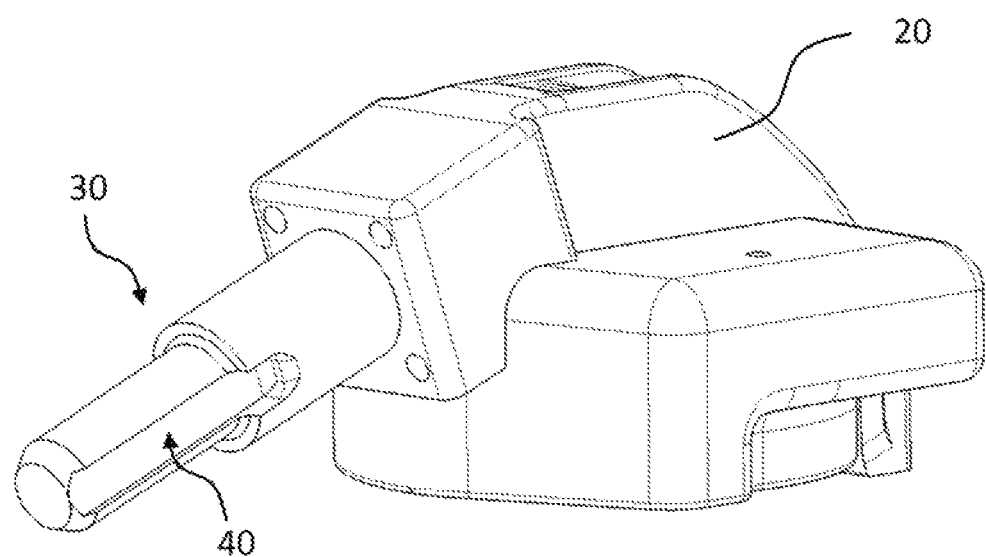
FIG. 5 is a partial view of an electronic unit according to an aspect of the invention, showing a perspective view of a pin attached to an electronics casing.

In a preferred exemplary embodiment illustrated in FIG. 5, the assembly formed by the pin 30 and the electronics casing 20 is over molded, for example using the RIM (Reaction Injection Molding) technique with polyurethane.

Advantageously, the pin 30, on its proximal portion 31, has at least one orifice 50. Thus, when the pin 30 and the electronics casing 20 are coated with the overmolding material, these orifices allow said overmolding material to pass in order to create a barb that adds further security to the connection between said pin and said electronics casing. Thus, the overmolding of the pin and of the electronics casing yields a robust assembly produced as a single piece.

According to another embodiment, said at least one orifice 50 is provided with a tapped thread and constitutes a hole for the passage of a screw for a removable attachment of the pin 30 by screwing to the electronics housing 20 along an axis perpendicular or approximately perpendicular to the longitudinal axis of the pin 30.

The pin 30 is produced by any method known per se, being for example molded or machined or forged.

The pin 30 of the electronic unit according to an aspect of the invention constitutes a simple and robust solution for assembling the inflation valve 10 with the electronics casing 20 that is accessible and can be maneuvered using a simple ordinary tool.

The invention claimed is:

1. An electronic unit for measuring operating parameters of a vehicle wheel, comprising:
   an inflation valve of the elastic deformation type, comprising:
      a valve body made of an elastomer material, provided with a longitudinal axial bore and intended to extend through an orifice made in a rim of the wheel, said valve body being made up of an elastically deformable trunk and of an abutment head for butting against the rim, which head is separated from the trunk by a neck designed to become positioned in airtight fashion in the orifice made in said rim, and
      a rigid hollow tube extending into the valve body,
   said valve body and said rigid hollow tube being designed and assembled so as to allow an elastic deformation of the trunk of the valve body in order to allow installation of the inflation valve through the orifice of the rim,
   an electronics casing, and
   means of attachment of the electronics casing and of the inflation valve, in a position of said electronics casing in which the latter extends in the continuation of said inflation valve,
   wherein the means of attachment of the electronics casing and of the inflation valve consist of a solid pin made from a material having a density lower than that of the material of which the rigid hollow tube extending into the valve body is made and having, at least over a portion of its length, longitudinal grooves that allow a flow of air to pass through said inflation valve, a proximal portion of said pin being configured to be attached to the electronics casing, and a distal portion of said pin being configured to be attached to the rigid hollow tube of the inflation valve.

2. The electronic unit as claimed in claim 1, wherein the pin is made of aluminum.

3. The electronic unit as claimed claim 1, wherein the pin has an I-shaped cross section.

4. The electronic unit as claimed in claim 1, wherein the pin has a star-shaped cross section.

5. The electronic unit as claimed in claim 1, wherein the pin has, on its distal portion, an entry chamfer allowing it to be inserted into the rigid hollow tube of the inflation valve.

6. The electronic unit as claimed in claim 1, wherein the pin is fastened to the electronics casing removably.

7. The electronic unit as claimed in claim 6, wherein the proximal end of the pin has a blind hole with a tapped thread constituting a hole for screw-fastening the electronics casing along a longitudinal axis of said pin.

8. The electronic unit as claimed in claim 1, wherein the pin is fixed permanently to the electronics casing.

9. The electronic unit as claimed in claim 6, wherein the pin on its proximal portion, has at least one orifice.

10. The electronic unit as claimed in claim 6, wherein said at least one orifice formed on the proximal portion of the pin is provided with a tapped thread and constitutes a hole for the passage of a screw for a screw-fastening to the electronics casing along an axis perpendicular to a longitudinal axis of said pin.

11. The electronic unit as claimed in claim 2, wherein the pin has an I-shaped cross section.

12. The electronic unit as claimed in claim 2, wherein the pin has a star-shaped cross section.

13. The electronic unit as claimed in claim 7, wherein the pin on its proximal portion, has at least one orifice.

14. The electronic unit as claimed in claim 8, wherein the pin on its proximal portion, has at least one orifice.

15. The electronic unit as claimed in claim 9, wherein said at least one orifice formed on the proximal portion of the pin is provided with a tapped thread and constitutes a hole for the passage of a screw for a screw-fastening to the electronics casing along an axis perpendicular to a longitudinal axis of said pin.

\* \* \* \* \*